United States Patent [19]

Inazawa et al.

[11] Patent Number: 4,641,208

[45] Date of Patent: Feb. 3, 1987

[54] RECORDING/REPRODUCING APPARATUS

[75] Inventors: Yoshizumi Inazawa, Kanagawa; Toshihiko Takahashi, Chiba; Toshiyuki Tani, Kanagawa; Shigeyuki Satomura, Tokyo, all of Japan

[73] Assignee: Sony Corporation, Tokyo, Japan

[21] Appl. No.: 807,746

[22] Filed: Dec. 11, 1985

[30] Foreign Application Priority Data

Dec. 24, 1984 [JP] Japan .................. 59-272545

[51] Int. Cl.$^4$ ............................................ G11B 27/28
[52] U.S. Cl. .................................................. 360/72.2
[58] Field of Search ...................................... 360/72.2

Primary Examiner—George G. Stellar
Attorney, Agent, or Firm—Lewis H. Eslinger; Alvin Sinderbrand

[57] ABSTRACT

In a recording/reproducing apparatus, a program identifying number is recorded in a beginning portion of each of a sequence of programs recorded on a record medium during a first recording operation, and a program start signal is recorded in a beginning portion of each program recorded in a second recording operation and thereafter. Subsequently, in a renumbering operation, each of the recorded program identifying numbers and/or program start signals is detected, with high speed movement of the record medium therebetween, and the previously existing recorded program identifying numbers and/or program start signals are replaced by a properly ordered sequence of program identifying numbers on the record medium.

12 Claims, 8 Drawing Figures

RECORDING/REPRODUCING APPARATUS

BACKGROUND OF THE INVENTION

1. Field of the Invention

The present invention relates to a recording/reproducing apparatus and, more particularly, to an apparatus suitable for use as a digital audio tape recorder.

2. Description of the Prior Art

Digital audio tape recorders which have been developed are of the fixed head type or the rotary head type. In a recorder of the fixed head type, a signal is recorded on a number of tracks parallel to the longitudinal direction of a magnetic tape using a multitrack fixed head. In a recorder of the rotary head type, a signal is recorded on tracks inclined with respect to the longitudinal direction of a magnetic tape by helically scanning the tape with a rotary head.

When an audio signal or other similar data is recorded by a digital audio tape recorder, a PCM audio signal is recorded on a predetermined region of a tape, and subcode data including a program identifying number, position data such as a time code and other necessary auxiliary data are recorded on another region of the tape. The position of the tape can be determined at any time on the basis of the subcode data, and tape-topping and the like can be performed in a search mode.

Since the subcode data includes data which changes with time, the data is continuously and entirely recorded for each program. For example, when music is being recorded, each song or tune is considered a program, and the time code, the program identifying number and the like are recorded from the beginning to the end of the respective program. In that case, when a plurality of programs are recorded in succession on a single tape during a single recording operation, the program identifying numbers "1","2","3", . . . are recorded in accordance with the recording order of the programs or songs.

Generally, when a user performs recording with a tape recorder, he rarely records a plurality of programs on a single virgin or previously unrecorded tape from a tape top to a tape end in a single recording operation. Normally, several programs are recorded in sequence in a first or single recording operation, and later, other programs are recorded in sequence starting immediately after the previously recorded programs, or another program is recorded to at least partly overlap programs already recorded on the tape.

For this reason, when m programs are recorded in a second recording operation after n programs have been recorded in a first recording operation, and the identifying program numbers "1" to "n" are recorded for identifying the originally recorded n programs, the program numbers "1" to "m" are recorded for identifying the m programs. Therefore, a plurality of the same program identifying numbers are recorded on a single tape, thereby completely losing the continuity and uniqueness of the program numbers required for identifying the various programs. In this manner, tape-topping cannot be performed.

In order to solve this problem, after a recording operation for a tape has been completed, the program identifying numbers can be renumbered to be in proper sequence. However, since each program identifying number is recorded over an entire program, renumbering takes the same time as was required for recording all of the programs. For example, when the programs are recorded on a tape for 180 minutes, the program identifying numbers can be renumbered by driving the tape at the same speed as was used for recording for 180 minutes. Moreover, since the program identifying numbers are recorded in the regions of the subcode data, it is very difficult to control renumbering timing.

OBJECTS AND SUMMARY OF THE INVENTION

Accordingly, it is an object of the present invention to provide a recording/reproducing apparatus which avoids the above-mentioned problems encountered with the prior art.

More specifically, it is an object of this invention to provide a recording/reproducing apparatus used for recording a plurality of audio or other informational signal programs in sequence on a record medium in a plurality of recording operations of the apparatus, and which is capable of conveniently and rapidly providing on the record medium distinctive program identifying signals representing an uninterrupted sequence of numbers corresponding to all of the recorded informational signal programs.

In accordance with an aspect of this invention, a recording/reproducing apparatus having head means for recording and reproducing signals on a tape or other record medium is provided with means operative in an initial recording operation of the apparatus for causing said head means to record a plurality of informational signal programs in sequence on the record medium; means operative in the initial recording operation for supplying to the head means distinctive program identifying signals to be recorded on said record medium, at locations corresponding to beginning portions of the informational signal programs, and representing respective numbers arranged in sequence for identifying the respective informational signal programs; means operative in at least one subsequent recording operation for causing the head means to record additional informational signal programs in sequence on said record medium; and means operative in each said subsequent recording operation for causing the head means to record on the record medium, at locations corresponding to beginning portions of the additional informational signal programs, respective standard program start signals.

Further, in accordance with this invention, in a renumbering operation after the subsequent or last recording operation, each of the program identifying and program start signals is detected and, in response thereto, the head means is made to record final distinctive program identifying signals representing an uninterrupted sequence of numbers corresponding to all of the recorded informational signal programs and being situated on the record medium at the locations of the detected program identifying and program start signals recorded in the initial and subsequent recording operations.

It is another feature of the apparatus embodying this invention that the record medium is driven at a predetermined speed during each recording operation and at a high speed substantially greater than said predetermined speed during detecting of the program identifying and program start signals in the renumbering operation, and that the program identifying and program start signals are recorded along sufficient lengths of the record medium so as to permit the reliable detecting thereof when the record medium is driven at high speed for minimizing the time required for the renumbering operation.

The above, and other objects, features and advantages of the invention, will be apparent in the following detailed description of a preferred embodiment when read in connection with the accompanying drawings in which the same reference numerals are used to identify the corresponding parts in the several views.

DETAILED DESCRIPTION OF THE PREFERRED EMBODIMENT

Figure 1:
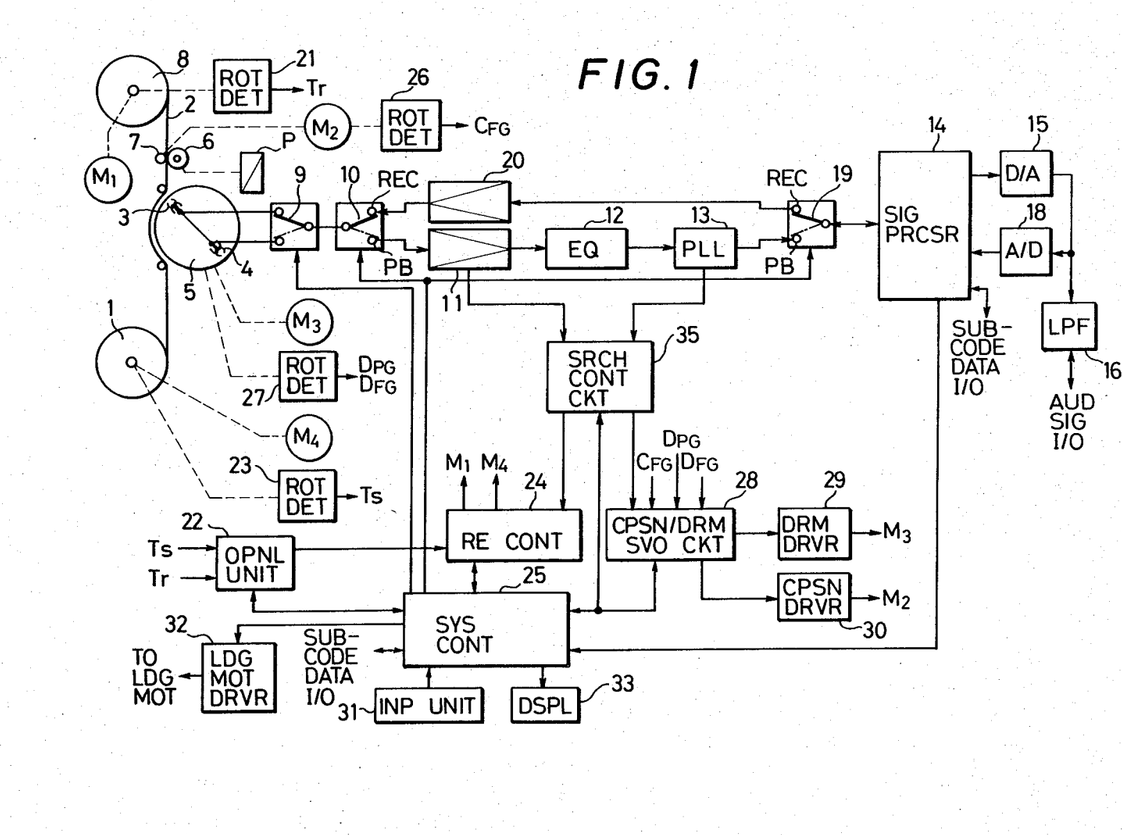
FIG. 1 is a block diagram showing a recording and reproducing apparatus according to an embodiment of the present invention.

Referring to FIG. 1 in detail, it will be seen that, in a digital tape recorder of the rotating head type according to an embodiment of the present invention, a magnetic tape 2 fed from a supply reel 1 is wound at a predetermined angle around a rotating guide drum 5 provided with rotating heads 3 and 4, and then is taken up by a take-up reel 8 after passing between a pinch roller 6 and a capstan 7.

Take-up reel 8, capstan 7, drum 5 and supply reel 1 are driven by a reel motor $M_1$, a capstan motor $M_2$, a drum motor $M_3$ and a reel motor $M_4$, respectively. Pinch roller 6 is driven or moved toward and away from capstan 7 by a solenoid or plunger P.

In a reproducing or playback mode, signals alternately reproduced by rotary heads 3 and 4 are passed through a switch 9 which is changed-over or switched in synchronism with rotation of the heads 3 and 4 and through a record/playback switch 10 in the position shown in broken lines on FIG. 1, and are applied to a PLL circuit 13 through a reproducing amplifier 11 and an equalizer 12. The reproduced signal synchronized by PLL circuit 13 is supplied to a signal processing circuit 14 through a record/playback switch 19, in the position shown in broken lines. The signal processing circuit 14 includes a PCM decoder and a subcode decoder operative in the reproducing mode, and a PCM encoder and a subcode encoder operative in a recording mode. In the playback mode, data obtained from the PCM decoder is converted into an analog audio signal by a D/A converter 15, and is supplied to an input/output terminal (not shown) through a low pass filter 16. Further, in the playback mode, the subcode decoder of processing circuit 14 generates subcode data which is supplied from processing circuit 14 to a respective input/output terminal (not shown).

In the recording mode, in which switches 10 and 19 are positioned as shown in full lines on FIG. 1, an input audio signal is converted into a digital signal by an A/D converter 18 after passing through low pass filter 18, and is supplied to the PCM encoder and the subcode encoder of signal processing circuit 14 together with input subcode data. The signal-processed PCM and subcode data are alternately supplied to heads 3 and 4 by switch 9 after passing through switch 19, a recording amplifier 20 and switch 10, whereby the PCM and subcode data are recorded on tape 2.

Rotation of take-up reel 8 is detected by a rotation detector 21, and a detection value $T_r$ is supplied from the latter to an operational unit 22. Rotation of supply reel 1 is detected by a rotation detector 23, and a corresponding detection value $T_s$ is also supplied to operational unit 22. The operational unit 22 calculates a total length and a current position of the tape 2 based upon the detection values $T_r$ and $T_s$, and supplies a calculation result to a reel controller 24 and to a system controller 25. The reel controller 24 controls motors $M_1$ and $M_4$ which drive reels 8 and 1, respectively.

Rotation of motor $M_2$ is detected by a rotation detector 26 which provides a detection value $C_{FG}$ indicating the rotational speed of capstan 7. Rotation of motor $M_3$ is detected by a rotation detector 27 which provides detection values $D_{FG}$ and $D_{PG}$ indicating the rotational speed and rotational phase, respectively, of heads 3 and 4. The values or outputs $C_{FG}$ and $D_{FG},D_{PG}$ from detectors 26 and 27 are supplied to a capstan-drum servo circuit 28. Based upon such input values, servo circuit 28 controls motors $M_3$ and $M_2$ through a drum driver 29 and a capstan driver 30, respectively.

Figure 6:
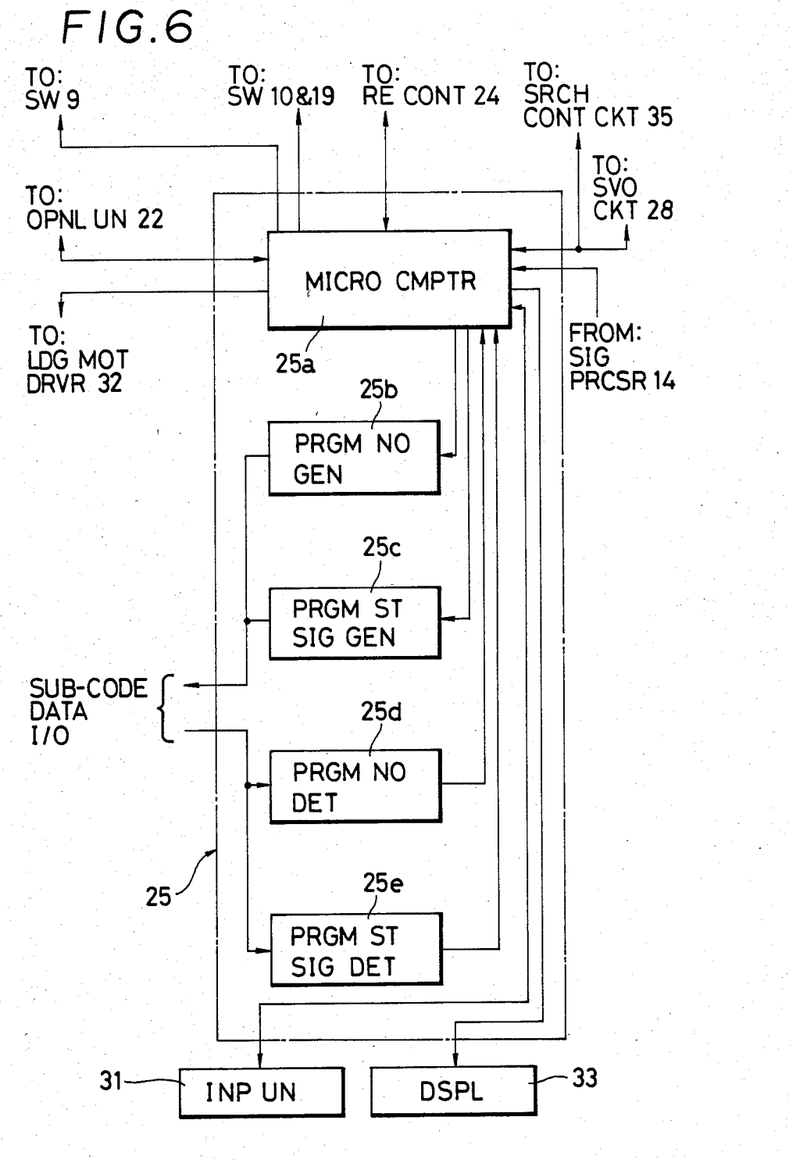
FIG. 6 is a block diagram showing further details of a system controller included in the apparatus of FIG. 1.

The system controller 25 may be constituted by a 4-bit microcomputer, such as, for example, the device available from Sony Corporation under the designation CXP-5016. As shown schematically on FIG. 6, system controller 25 generally comprises a microprocessor 25a, a program number generator 25b and a program start signal generator 25c for respectively generating program number or identifying signals and program start signals to be recorded in subcode regions of the tape, and a program number detector 25d and a program start detector 25e for detecting program member and program start signals, respectively, reproduced from subcode regions of the tape.

System controller 25 receives an instruction or command for establishing a selected operating mode from an input unit 31 upon depression of a corresponding operation selecting button thereof, and supplies and receives other required signals to and from, respectively, other circuits of the apparatus, as shown on FIG. 1. More particularly, controller 25 changes-over switches 9,10 and 19, and controls a tape loading motor (not shown) through a loading motor driver 32. In addition, controller 25 supplies a display signal to a display circuit 33 which visually indicates the position of the tape. In a search mode, for example, during a renumbering operation, a search control circuit 35 controls reel motors $M_1$ and $M_4$, capstan motor $M_2$ and drum motor $M_3$ through reel controller 24, servo circuit 28 and system controller 25 based upon signals from reproducing amplifier 11 and PLL circuit 13, thereby performing a search operation. Search control circuit 35 may be arranged as shown in detail in our copending commonly assigned U.S. patent application Ser. No. 06/791,518, filed Oct. 25, 1985, and the disclosure of which is incorporated by reference herein.

The operation of the above-described recording/reproducing apparatus in accordance with this invention during successive recording operations and then during a renumbering operation will now be explained with reference to FIGS. 2A, 2B and 2C. In each of FIGS. 2A, 2B and 2C, the tape 2 is assumed to be moved in its longitudinal direction indicated by the arrow a while the rotary heads 3 and 4 of FIG. 1 alternately scan the tape obliquely thereacross. Each of the heads 3 and 4, as it scans the tape 2, is initially supplied with subcode data for recording in a subcode data region 2a extending along one side of the tape and, during the remainder of the scan across the tape, the scanning head is supplied with PCM data for recording in the remaining region 2b of the tape.

Figure 2A:
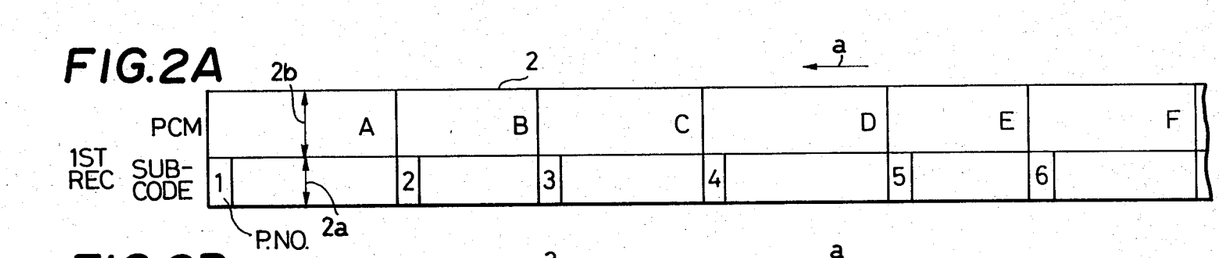
FIGS. 2A, 2B and 2C are diagrammatic views of tape formats showing changes in the recorded signals when recording and renumbering operations are performed.

During a first recording operation with a new or previously unrecorded tape, a plurality of programs, for example, six programs A–F, as shown on FIG. 2A, are recorded in sequence on the PCM region 2b of tape 2. During such recording of the programs A–F in sequence in the first recording operation, program number generator 25b of system controller 25 is suitably made operative for causing the heads 3 and 4 during scanning of subcode region 2a of tape 2 to record therein, at locations along the tape corresponding to beginning portions of the programs A–F, distinctive program identifying signals representing respective program numbers (hereinafter referred to as P.No.) "1" to "6", respectively, arranged in sequence for identifying the respective audio or other informational signal programs A–F.

After the above described first recording operation, it may be desired to record additional or other programs on the tape 2 in a second or subsequent recording operation. For example, as shown on FIG. 2B, during such second recording operation, three programs G,H and I may be recorded in sequence in PCM region 2b, starting from a location along tape 2 which corresponds approximately to the middle of the previously recorded program C. In accordance with the present invention, program start signal generator 25c of system controller 25 is made operative in the second or any other subsequent recording operation for causing the heads 3 and 4 to record in the subcode region 2a of tape 2, at a location corresponding to a beginning portion of each of the additional information signal programs G,H and I, a standard program start signal PS. In other words, during the second or subsequent recording operation, a standard program start signal PS is recorded on the tape in place of the distinctive program identifying signal or number P.No. that would otherwise be provided for identifying the programs G,H and I if such programs were recorded in a first recording operation.

Figure 3:
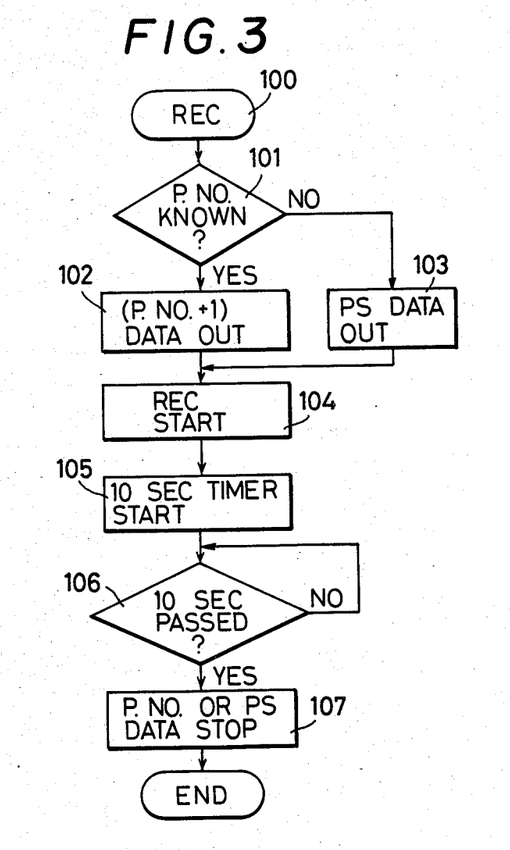
FIG. 3 is a flow chart showing operations of the apparatus in a recording mode.

The above-described recording of a distinctive program identifying signal or number or of a standard program start signal at the beginning of each program being recorded is desirably effected in accordance with the routine shown on FIG. 3. As will be later shown in detail, in accordance with that routine, each program identifying number or signal P.No. and each program start signal PS is recorded on the tape 2 for about ten seconds. In other words, each of the program identifying numbers or signals P.No. and each of the program start signals PS is recorded in region 2a along a length of the tape which is scanned by rotary heads 3 and 4 during movement of the tape at its normal recording speed for about ten seconds. Such recording of each of the program identifying signals or numbers P.No. and each of the program start signals PS along a substantial length of the tape ensures that the program identifying signals or numbers P.No. and the program start signals PS will be reliably reproduced and detected by detectors 25d and 25e, respectively, when the tape is driven at a high speed, for example, 200 times the normal recording speed, in a search mode of the apparatus.

Referring in detail to the routine of FIG. 3, it will be seen that, after the recording mode of the apparatus is selected in step 100, for example, by actuating a respective operation selecting button of input unit 31, it is determined in step 101 if the previously recorded program identifying signal or number P.No. is known, that is, whether the present recording operation is a first recording operation or a subsequent recording operation. If a first recording operation is involved, that is, if the previously recorded P.No., if any, is known, program number generator 25b is made operative in step 102 to provide data corresponding to (P.No.+1), that is, data corresponding to the program identifying number next in order after the known previously recorded program identifying number. If it is determined in step 101 there is a previously recorded program identifying number which is not known, that is, that a second or subsequent recording operation is involved, then program start signal generator 25c is made operative in step 103 to provide data corresponding to the standard program start signal PS. At a suitable time corresponding to the beginning portion of the respective informational signal program, recording of the program identifying number P.No. or program start signal PS is initiated in step 104 and, simultaneously therewith, a ten second timer is made operative in step 105. Upon conclusion of the ten second period set by the timer and during which the program identifying number or the program start signal is recorded, as determined in step 106, the output of program identifying number data from generator 25b or of program start signal data from generator 25c is halted in step 107 thereby bringing to an end the routine for recording a program identifying number or program start signal.

Figure 4:
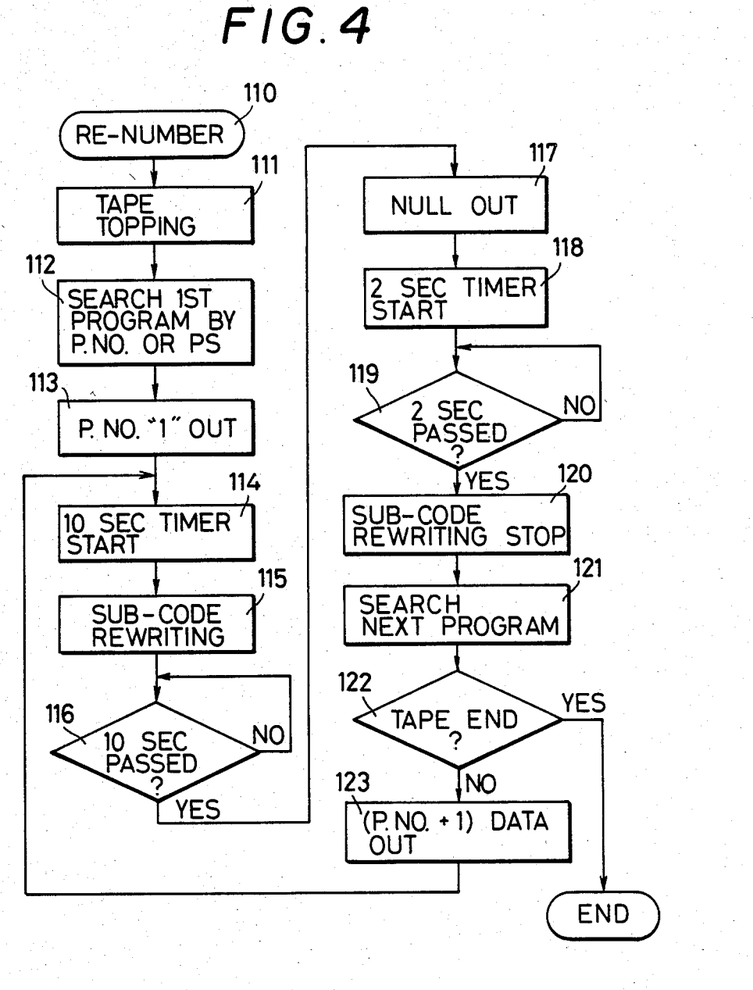
FIG. 4 is a flow chart showing operations of the apparatus in a renumbering mode.

Upon the completion of the recording of programs G,H and I in the second recording operation, a suitable operation selecting button of input unit 31 is actuated for selecting a renumbering mode of the apparatus, as in step 110 of the routine for such renumbering mode shown on FIG. 4. In response to selection of the renumbering mode, the recording/reproducing apparatus is made to effect tape topping in step 111, that is, the tape is driven in the rewind direction to the top or starting end thereof. Then, in step 112, the first program A recorded on the tape is searched by causing program number detector 25d and program start signal detector 25e to be made operative to detect either the respective program identifying number P.No. or program start signal PS. In the case of the recorded tape shown on FIG. 2B, the first recorded program A has associated therewith P.No. "1" and, upon the detecting thereof in step 112, program number generator 25b is made operative in step 113 to provide data representing the first program identifying number P.No. "1" and, simultaneously, to start the operation of a ten second timer in step 114. In the next step 115, the data representing P.No. "1" is recorded for ten seconds at the same location in which P.No. "1" had been originally recorded on the tape 2, as will be apparent from a comparison of FIGS. 2B and 2C. Upon the expiration of the ten second period for recording the P.No., as determined in step 116, a null code is written or recorded for about two seconds following the recorded P.No., as in steps 117, 118 and 119, so as to ensure that any remaining portion of the previously recorded program identifying number or program start signal will be erased thereby. At the completion of such recording of the null code, as determined in step 119, subcode rewriting is halted in step 120 and searching for the next program B is initiated in step 121.

In searching for such next program on tape 2, the latter is driven at a high speed, for example, 200 times the normal recording speed, until the respective program identifying number or program start signal is detected by detector 25d or 25e, respectively. In the example being here described, when P.No. "2" previously recorded in association with program B is detected, the tape is braked. Since searching is effected at high speed, the braked tape will move past the position at which P.No. "2" is detected, whereupon, the tape is driven in the rewind direction at a suitable speed, for example, 16 times the normal speed, and is stopped at the point where P.No. "2" is again detected. Of course, if the search step 121 results in detection of the tape end, as in step 122, before a program identifying number or a program start signal is detected, the renumbering routine is ended. However, if the search step 121 does result in detection of a previously recorded program identifying number P.No. or program start signal PS associated with the next recorded program before the end of the tape is detected, then program number generator 25b is made operative in step 123 to provide data representing the next program identifying number (P.No.+1), and a renumbering routine returns to the point therein before step 114. Thus, in the case of a renumbering operation being performed on the tape shown in FIG. 2B, after the tape is stopped at the beginning of the portion thereof on which program B is recorded, the program identifying number P.No. "2" is rewritten in the subcode region of the tape for ten seconds. Thereafter, the next program C is searched and the respective program identifying number P.No. "3" is rewritten at the corresponding location in the subcode region of the tape. Then, the search for the next program G is initiated and results in the detection of the corresponding standard program start signal PS which is replaced by the next program identifying number P.No. "4" recorded for ten seconds at the corresponding location in the subcode region, as shown on FIG. 2C. Similarly, programs H and I are searched by detecting the respective program start signals PS, and the program identifying numbers P.No. "5" and P.No. "6" are suitably recorded in place of the program start signals PS originally associated with programs H and I. Finally, the program F is searched by detecting the program identifying number P.No. "6" that was recorded in association therewith in the first recording operation (FIG. 2A), and such program identifying number P.No. "6" is rewritten or renumbered as P.No. "7", as shown on FIG. 2C, thereby completing the renumbering operation.

Figures 2B, 2C:
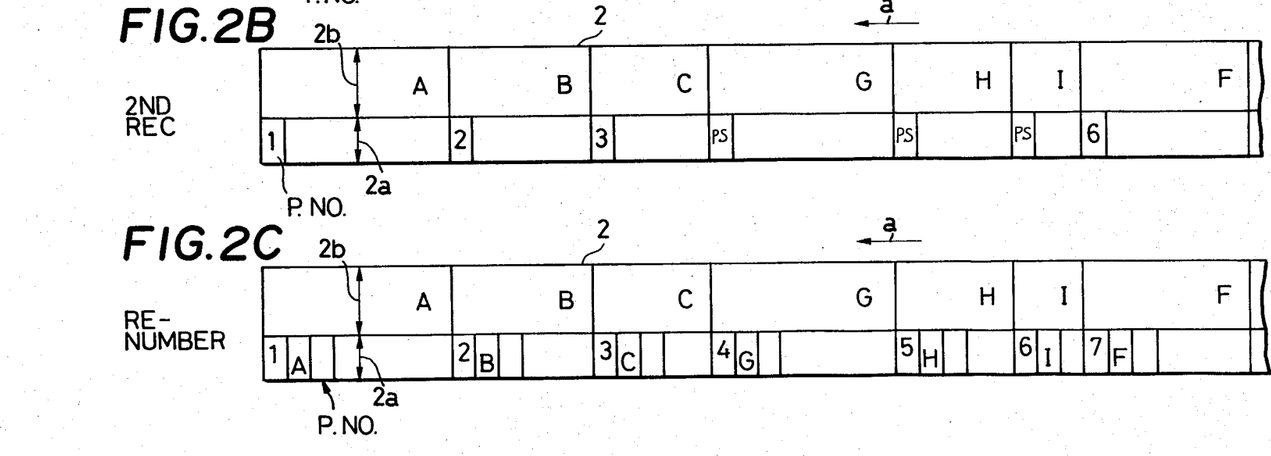

It will be appreciated that, in the above-described renumbering operation, in those instances where the detected program identifying number previously recorded on the tape is correct, for example, as in the case of the program identifying numbers P.No. "1", P.No. "2" and P.No. "3" associated with programs A,B and C, respectively, the recorded tape of FIG. 2B, it is not necessary to effect renumbering of the detected program identifying number. In each such case, the routine or program for the renumbering operation can be arranged or modified to cause the immediate initiation of the search for the next recorded program after each correct program identifying number has been detected.

It is further to be noted that, if desired, data representing titles of the programs can be recorded as subcode data in the subcode region, for example, the titles "A", "B","C","G","H","I" and "F" recorded after the renumbered program identifying numbers "1","2","3","4","5","6" and "7", respectively, as shown on FIG. 2C. Furthermore, auxiliary codes, such as, time codes or the like, can be recorded after the titles in the subcode region of the tape. In that event, the subcode data on the renumbered tape is constituted by the program identifying number P.No., the title, the auxiliary code and the like, associated with each of the recorded programs.

Figure 5:
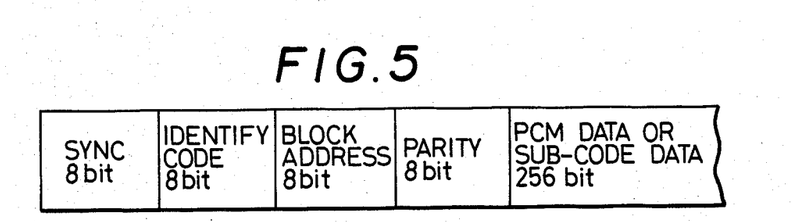
FIG. 5 is a diagrammatic view showing an example of a data block format.

Each data block recorded in the subcode data region 2a or in the PCM data region 2b of the tape 2 may have the format shown on FIG. 5. More particularly, and by way of example, each such data block may comprise an 8-bit synchronizing signal which is first recorded, and then an 8-bit identifying code, an 8-bit block address code, and an 8-bit parity check code, followed by 256-bits of subcode data or PCM data. In the case of a subcode data block having the format shown on FIG. 5, the program start signal PS is represented by one bit of the 8-bit identifying code of the block. Further, in the case of each subcode data block, the subcode data thereof is constituted by the program identifying number P.No., if present, the title of the corresponding program, the time code and the like. Further, the PCM data blocks and the subcode data blocks recorded on different regions of the tape may be discriminated from each other by the respective block address code. For example, the data block may be identified as a PCM data block when the most significant bit (MSB) in the block address code is "0", and the data block is identified as a subcode data block when the most significant bit in its block address code is "1".

Although the present invention has been described above in its application to a digital tape recorder of the rotary head type, it will be appreciated that the invention can be similarly applied to a tape recorder of the fixed head type.

It is further to be appreciated that, in the recording-/reproducing apparatus according to this invention, the renumbering operation for ensuring that the programs on the completed tape will be identified by an uninterrupted sequence of program identifying numbers can be rapidly effected since the searching or movement of the tape between successive program identifying numbers or program start signals is effected at high speed.

Having described an illustrative embodiment of the invention with reference to the accompanying drawing, it is to be understood that the invention is not limited to that precise embodiment, and that various changes and modifications can be effected therein by one skilled in the art without departing from the scope or spirit of the invention as defined in the appended claims.

What is claimed is:

1. A recording/reproducing apparatus comprising:
   head means for recording a plurality of informational signal programs in sequence on a record medium in an initial recording operation of the apparatus;
   means operative in said initial recording operation for causing said head means to record on said record medium, at locations corresponding to beginning portions of said informational signal programs, distinctive program identifying signals representing respective numbers arranged in sequence for identifying the respective informational signal programs;

means for causing said head means to record at least one additional informational signal program on said record medium in at least one subsequent recording operation; and means operative in each said subsequent recording operation for causing said head means to record on said record medium, at a location corresponding to a beginning portion of each said additional informational signal program, a standard program start signal.

2. A recording/reproducing apparatus according to claim 1; further comprising means operative in a renumbering operation after said subsequent recording operation for detecting each of said program identifying and program start signals and for causing said head means to record final distinctive program identifying signals representing an uninterrupted sequence of numbers corresponding to all of the recorded informational signal programs and being situated on the record medium at said locations of the detected program identifying and program start signals recorded in said initial and subsequent recording operations, respectively.

3. A recording/reproducing apparatus according to claim 2; further comprising means for driving said record medium at a predetermined speed during each recording operation and at a high speed substantially greater than said predetermined speed during said detecting of the program identifying and program start signals in said renumbering operation; and in which said program identifying and program start signals are recorded along sufficient lengths of said record medium so as to permit the detection thereof when said record medium is driven at said high speed.

4. A recording/reproducing apparatus according to claim 1; in which said record medium is a tape, said recorded informational, program identifying and program start signals are digital, and said head means are rotary.

5. A recording/reproducing apparatus according to claim 1; in which said record medium has regions in which said head means records main signal data blocks and subcode data blocks, respectively.

6. A recording/reproducing apparatus according to claim 5; wherein said subcode data blocks include said program identifying signals.

7. A recording/reproducing apparatus according to claim 5; wherein said subcode data blocks include said program start signals.

8. A recording/reproducing apparatus according to claim 5; wherein said subcode data blocks include time codes.

9. A recording/reproducing apparatus according to claim 5; wherein said subcode data blocks include data representing titles of the respective informational signal programs included in the respective main signal data blocks.

10. A recording/reproducing apparatus comprising:

head means for recording and reproducing signals on a record medium;

means operative in an initial recording operation of the apparatus for causing said head means to record a plurality of informational signal programs in sequence on the record medium;

program number generating means operative in said initial recording operation for supplying to said head means distinctive program identifying signals to be recorded on said record medium, at locations corresponding to beginning portions of said informational signal programs, and representing respective numbers arranged in sequence for identifying the respective informational signal programs;

means operative in at least one subsequent recording operation for causing said head means to record additional informational signal programs in sequence on said record medium; and program start signal generating means operative in each said subsequent recording operation for causing said head means to record on said record medium, at locations corresponding to beginning portions of said additional informational signal programs, respective standard program start signals.

11. A recording/reproducing apparatus according to claim 10; further comprising detecting means operative in a renumbering operation after said subsequent recording operation for detecting each of said program identifying and program start signals for causing said program number generating means in cooperation with said head means to record final distinctive program identifying signals representing an uninterrupted sequence of numbers corresponding to all of the recorded informational signal programs and being situated on the record medium at said locations of the detected program identifying and program start signals recorded in said initial and subsequent recording operations.

12. A recording/reproducing apparatus according to claim 11;, further comprising means for driving said record medium at a predetermined speed during each said recording operation and at a high speed substantially greater than said predetermined speed during said detecting of the program identifying and program start signals in said renumbering operation; and in which said program identifying and program start signals are recorded along sufficient lengths of said record medium so as to permit said detecting means to reliably detect the same when said record medium is driven at said high speed.

* * * * *